No. 892,656. PATENTED JULY 7, 1908.
G. W. EUKER.
CONTROLLER FOR ALTERNATING CURRENT MOTORS.
APPLICATION FILED AUG. 27, 1907.

2 SHEETS—SHEET 1.

Witnesses:

Inventor
George W. Euker
By his Attorneys
Rosenbaum & Stockbridge

No. 892,656. PATENTED JULY 7, 1908.
G. W. EUKER.
CONTROLLER FOR ALTERNATING CURRENT MOTORS.
APPLICATION FILED AUG. 27, 1907.
2 SHEETS—SHEET 2.
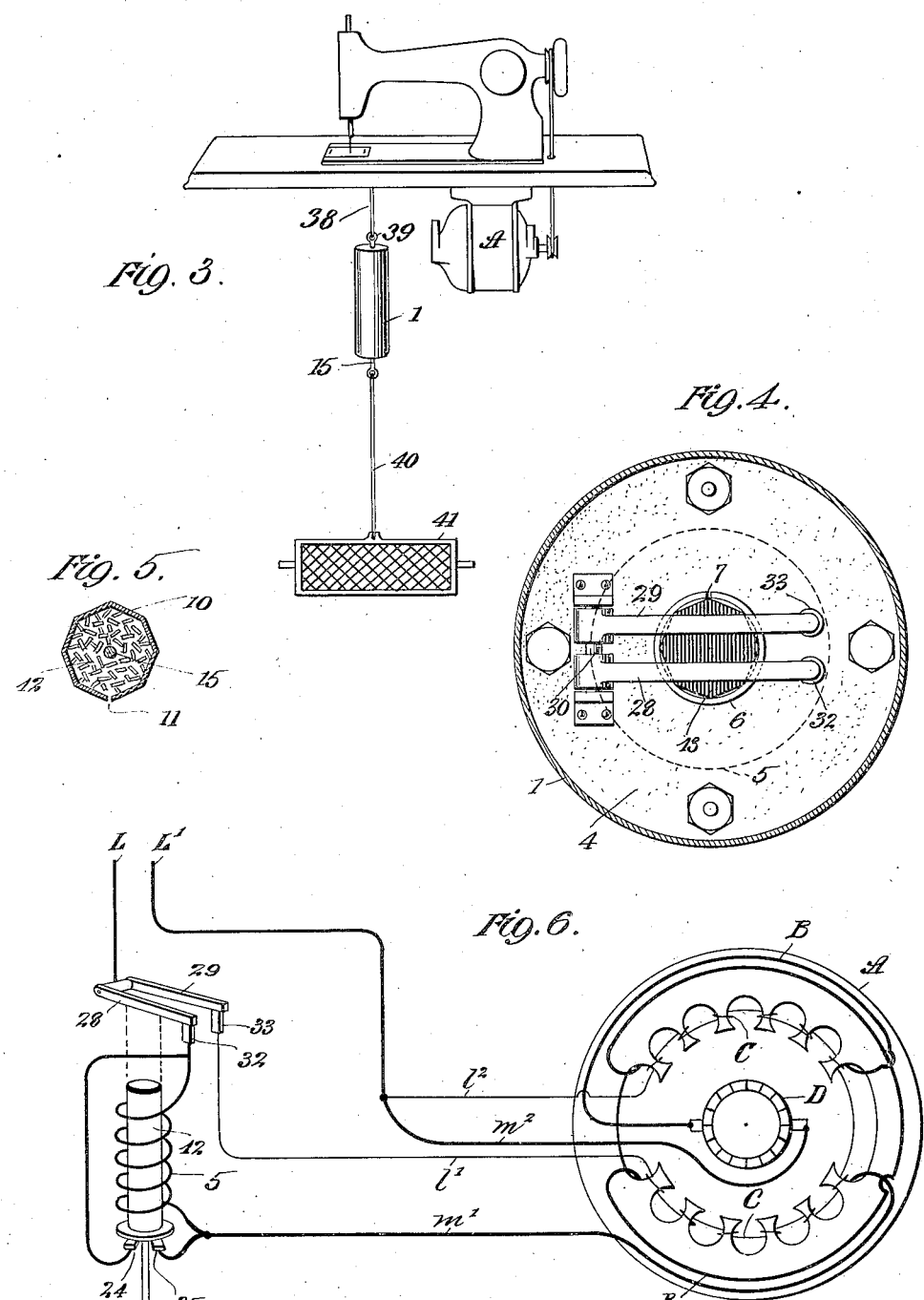

UNITED STATES PATENT OFFICE.

GEORGE W. EUKER, OF BOSTON, MASSACHUSETTS, ASSIGNOR TO DIEHL MANUFACTURING COMPANY, A CORPORATION OF NEW JERSEY.

CONTROLLER FOR ALTERNATING-CURRENT MOTORS.

No. 892,656.      Specification of Letters Patent.      Patented July 7, 1908.

Application filed August 27, 1907. Serial No. 390,322.

*To all whom it may concern:*

Be it known that I, GEORGE W. EUKER, a citizen of the United States, residing at Boston, in the county of Suffolk and State of Massachusetts, have invented certain new and useful Improvements in Controllers for Alternating-Current Motors, of which the following is a full, clear, and exact description.

My invention relates to circuit controllers for alternating current motors, particularly small motors used in driving light machinery which is frequently started and stopped, and run at varying speeds in use.

The present controller is particularly adapted for use in operating sewing machines where the control is exercised by a foot pedal. By means of a foot pedal it is possible to obtain a vertical and up and down movement of either definite or variable range, and the controller constructed in accordance with the present invention is specially applicable for use in this way. Means are provided for completing a shunt field circuit of the motor prior to the completion of the series circuit including the armature winding. I also provide for gradually diminishing the inductance value of a winding initially included in the motor circuit, but which is finally eliminated or cut out when the motor comes up to full speed and is running normally. A practical construction of motor having windings of the sort mentioned forms the subject of my copending application, Serial No. 389,334. In the present application, I have merely illustrated diagrammatically a motor having these general features, it being understood that any similar or equivalent motor could be employed as desired.

Figure 1:
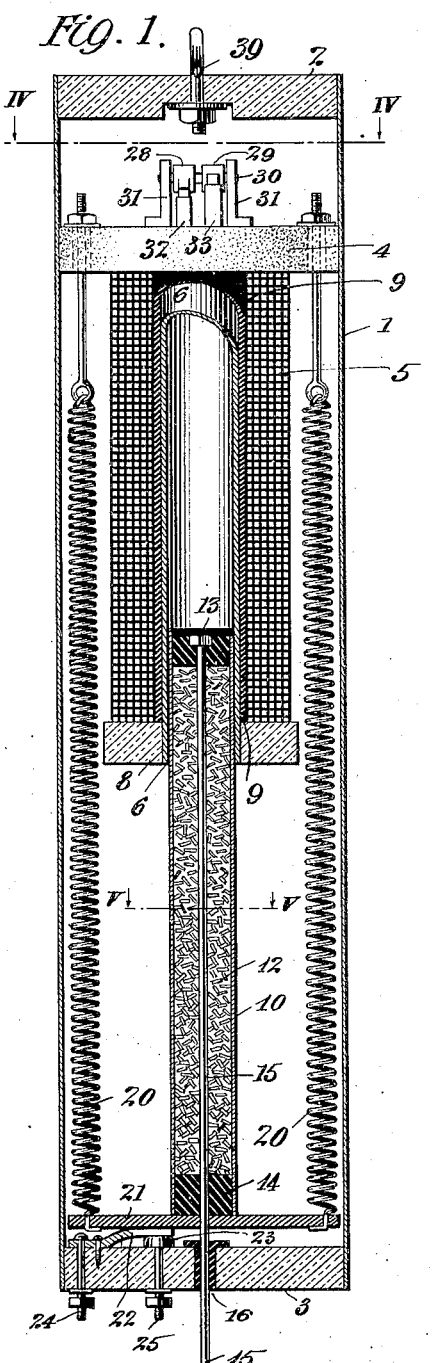
Figure 2:
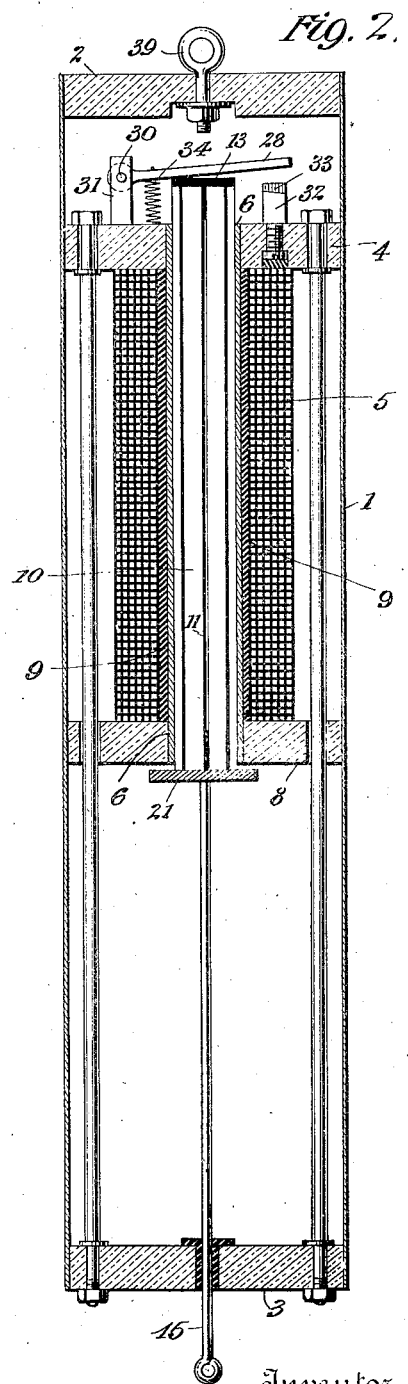

In the drawings, Figure 1 is a vertical sectional view of an alternating current motor controller embodying the principles of my invention; Fig. 2 is a similar sectional view taken on a plane at right angles to that of Fig. 1; Fig. 3 illustrates the controller applied to a sewing machine driven by an alternating current motor; Fig. 4 is a section on the line IV—IV of Fig. 1, looking in the direction of the arrows; Fig. 5 is a section on the line V—V of Fig. 1, looking in the direction of the arrows. Fig. 6 illustrates diagrammatically the arrangement of the circuits for operating an alternating current motor.

Referring to the drawings in which like parts are designated by the same reference sign, 1 indicates a frame or casing which is conveniently made of cylindrical form, with suitable end plates or heads, 2, 3, at the respective ends. 4 indicates an additional plate which forms a supporting base for certain of the controller parts hereinafter described. All of the parts 2, 3 and 4 may be, and preferably are, of vitreous or insulating material.

Depending from and supported by the base or part 4 there is a solenoid coil or winding 5. In practice, I make use of a metal tube 6, longitudinally slotted on one side at 7 (see Fig. 4). This tube fits tightly in the opening in the base 4, and is supported by a supplemental base 8, suitably spaced apart from the base 4 in the casing 1. This tube 6 forms a strong and convenient support on which the solenoid coil 5 may be wound, there being of course a layer of paper or insulating material 9, interposed between the tube 6 and the initial layer of the winding.

Within the tube 6 and guided thereby to have a longitudinal or axial movement there is a second tube 10, also conveniently of metal longitudinally slotted on one side at 11 (see Fig. 5). I make the tube 10 octagonal or non-circular in its sectional outline, so that an air space is left between it and the surrounding tube 6, although the tube 10 is closely guided in its inclosing tube 6, without any side play or looseness therein.

The tube 10 is made to constitute a receptacle filled with iron filings, wires, laminations, chips, pieces or particles 12, and which constitutes a core for the solenoid 5. For this purpose there may be provided plugs or heads 13 and 14 at the respective ends of the tube 10. In practice, I prefer short pieces of iron wire about $\frac{1}{8}''$ long and $\frac{1}{64}''$ in diameter, carbonized and tightly compressed as a filler for the tube 10. The tube being filled, the heads or plugs 13 and 14 are securely fastened in place by a connecting rod 15 bolted to the upper plug and extending downwardly through the lower plug and through the head 3 of the casing.

16 indicates a bushing through which the rod 10 may be guided to facilitate its up and down movement through the head 3.

Means are provided for normally impelling the core 12 upward in its guiding tube 6 and within the solenoid 5. I have illustrated a pair of tensile springs 20, anchored to the base 4 at their upper ends, and connected to a plate 21, at their lower ends which passes beneath and abuts against the core 12. The tension of these springs is such as to impel the core upward, together with its connected parts against the influence of gravity and friction. When the core is at its lowermost position, as shown in Fig. 1, I provide means for cutting out the solenoid winding. This preferably comprises a spring 22, and a metallic stud or contact 23. The tension of the spring 22 is such that it is normally separated from the button 23, but is pressed downward into contact therewith by the plate 21 when the core 12 is at its lowermost position, as shown in Fig. 1.

24 and 25 indicate the respective terminals for the spring 22 and the stud 23.

In addition to the mechanism for varying the inductance of the winding 5 and cutting out such winding from the circuit, as thus far described, there is an additional switch device or mechanism for separately controlling shunt and series circuits in the motor.

28 and 29 denote levers pivoted on a common supporting pin 30, which is supported by standards 31 from the base 4.

32 and 33 are metallic studs or contacts projecting upward from the upper surface of the base 4, and adapted to be engaged by the respective levers 28 and 29, when these fall into their lowermost positions by gravity or under the influence of small tensile springs 34. The stud 33 is made to project somewhat higher than the stud 32, so that it will be engaged first and disengaged last in the movement of the levers 28 and 29, assuming that these are constrained to move together in a single plane. The levers are so constrained to move together in a single plane by the engagement of the upper plug 13 of the movable core 12 which is in a position to impinge against both levers at the limit of its upward movement and raise them off their studs or contacts 32, 33, in the order or sequence mentioned. I make the plug 13 of insulating material.

In use the apparatus may be suspended beneath the table of a sewing machine by a depending link 38 (see Fig. 3) which engages an eye 39, in the upper head 2.

40 denotes a link depending from the stem 15 of the core 12, and which is attached to a pedal 41, of any ordinary construction. It is evident that movement of the pedal is communicated to the core 12 through the link 40, and the stem 15. As already noted, the tension of the springs 20 is such as to keep the pedal raised, so that a varying downward pressure of the foot is all that is necessary in use to effect all the operations of the controller.

In Fig. 6 electrical circuits adapted to the present construction of controller are particularly shown. L and L' are line wires or circuit connections from a source of alternating current; A is a motor having series field windings B, shunt field windings C, and an armature D. When the core 12 is raised, the levers 28 and 29 are also elevated thereby out of contact with their respective studs or conductors 32, 33. All circuits of the motor are accordingly interrupted. If now the core 12 is lowered slightly, the lever 29 will initially contact with the stud 33, closing a circuit from wire L, through lever 29, stud 33, wire $l'$, shunt coils C, C, and wire $l^2$, back to line wire L'. The shunt field of the motor is accordingly initially energized. Thereafter as the core 12 continues to be lowered, the lever 28 comes into contact with the stud or conductor 32, and the series circuit of the motor is completed through lever 28, stud 32, solenoid or winding 5, wire $m'$, series windings B, B, armature D, wire $m^2$, back to line wire L'. At this time the core 12 is in the position corresponding to maximum inductance of the winding 5, so that the current flow through the motor is not excessive. The core 12 is quickly drawn downward as the motor speeds up and when the motor has arrived at full speed, the core 12 has reached its lowermost position, and closes the circuit between the terminals 24 and 25, thereby cutting out the winding 5 altogether. The motor is now running normally with the field fully energized and all inductance cut out of the armature circuit. When it is desired to stop the motor, the core 12 is raised until it impinges against the levers 28 and elevates them off their seats or contacts 32, 33. It will be observed that the lever 28 is raised off its contact before the lever 29, so that a magnetic braking action is exerted to stop the motor by virtue of the continuing shunt field.

The construction is such that undue heating of the controller by the alternating current is always prevented. The construction of the tubes 6 and 10 vertically slotted on one side has already been explained, and it is evident that this construction prevents induced currents in these tubes which would heat them and cause a loss of energy. In like manner the construction of the core 10 of short pieces of iron wire is found to be practically very efficient and avoid local induced currents of every sort.

What I claim, is:

1. In a controller for alternating current motors, a solenoid having a core, means for moving the core to any position longitudinally within the solenoid, means for completing a circuit through said solenoid, and separate means for initially completing an independent circuit.

2. In a controller for alternating current motors, a solenoid having a core, means for moving the core to any position longitudinally within the solenoid, means actuated by the movement of said core for completing a circuit through said solenoid, and separate means for initially completing an independent circuit.

3. In a controller for alternating current motors, a solenoid having a core, means for moving the core to any position longitudinally within the solenoid, means actuated by said core for completing a circuit through said solenoid, and separate means also actuated by the said core for initially completing an independent circuit.

4. In combination with an alternating current motor and a controller therefor, an inductance winding, means for varying the inductance thereof, said means operating to initially close the shunt circuit of the motor, and thereafter close the series circuit of the same.

5. In a controller for alternating current motors having a shunt and series circuits, an inductance winding, means for varying the inductance thereof, said means operating to initially close the shunt circuit of the motor and thereafter close the series circuit of the same, and means for finally short-circuiting said winding.

6. In a controller for alternating current motors, an inductance, means for varying the inductance thereof, said means operating to complete a plurality of circuits in a successive order, and means for cutting out said inductance from its circuit after its value has become a minimum.

7. In a controller for alternating current motors, a solenoid, a core movable longitudinally therein, springs for impelling said core into said solenoid, and means for withdrawing said core, whereby the inductance of the solenoid is changed.

8. In a controller for alternating current motors, a casing having a solenoid co-axially disposed therein, a core longitudinally movable within said solenoid, means within the casing for impelling said core into the solenoid, and extending outside said casing for withdrawing said core from the solenoid, whereby the inductance of the solenoid winding is changed.

9. In a controller for alternating current motors, a casing having a plurality of supporting bases therein, a solenoid supported between said bases, a core longitudinally movable into said solenoid, springs for impelling said core into said solenoid, and means extending outside the casing for withdrawing said core from the solenoid, whereby the inductance of the solenoid winding is changed.

10. In combination with an alternating current motor and a controller, a longitudinally slotted metal tube, a solenoid exteriorly supported on said tube, means for completing a motor circuit through said solenoid, and a core of non-circular outline longitudinally movable within said tube.

11. In a controller for alternating current motors, a motor, a longitudinally slotted tube, a solenoid supported on the exterior of said tube, means for completing a motor circuit through said solenoid, and a core comprising a longitudinally slotted tube filled with small iron bodies, said tube being of non-circular outline.

12. In a controller for alternating current motors, a motor, a longitudinally slotted tube, a solenoid supported on the exterior of said tube, means for completing a motor circuit through said solenoid, and a core comprising a longitudinally slotted tube filled with pieces of iron wire, carbonized and tightly compressed.

13. In a controller for alternating current motors, a solenoid having a core longitudinally movable therein, and means engaged by the core at the initial part of its movement out of the solenoid for successively closing a plurality of circuits.

14. In a controller for alternating current motors, a solenoid having a core longitudinally movable therein, and levers engaged by the core at the initial part of its movement out of the solenoid for successively closing a plurality of circuits.

15. In a controller for alternating current motors, a solenoid having a core longitudinally movable therein, a pair of levers in the path of said core, and a pair of studs or contacts engaged by the said levers, said studs or contacts being engaged by the levers in a predetermined order as the core moves out of said solenoid.

16. In a controller for alternating current motors, a solenoid having a core longitudinally movable therein, a pair of levers pivoted in the path of said core, and studs or contacts of different height in a position to be engaged by the respective levers.

17. In a controller for alternating current motors, a casing having an eye at one end and a link extending therefrom by which it may be attached to any convenient object, a solenoid having a core within the casing, and a link extending downwardly from said core and adapted to be attached to a treadle, whereby the inductance of said solenoid is varied by movement of said treadle.

In witness whereof, I subscribe my signature, in the presence of two witnesses.

GEORGE W. EUKER.

Witnesses:
WALDO M. CHAPIN,
WM. M. STOCKBRIDGE.